(12) United States Patent
Tsuganezawa

(10) Patent No.: US 8,148,852 B2
(45) Date of Patent: Apr. 3, 2012

(54) ELECTRONIC DEVICE AND PRINTING DEVICE

(75) Inventor: Yoshiyuki Tsuganezawa, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 328 days.

(21) Appl. No.: 12/684,718

(22) Filed: Jan. 8, 2010

(65) Prior Publication Data

US 2010/0213771 A1 Aug. 26, 2010

(30) Foreign Application Priority Data

Feb. 23, 2009 (JP) ................................. 2009-038958

(51) Int. Cl.
*H01H 19/64* (2006.01)
(52) U.S. Cl. ........................................................ 307/113
(58) Field of Classification Search .................. 307/113, 307/140, 125
See application file for complete search history.

(56) References Cited

U.S. PATENT DOCUMENTS

| | | | | |
|---|---|---|---|---|
| 5,345,046 A | * | 9/1994 | Rynaski et al. ............... | 187/390 |
| 6,101,576 A | | 8/2000 | Kobayashi et al. ........... | 711/122 |
| 6,707,565 B2 | * | 3/2004 | Ohira et al. .................. | 358/1.15 |
| 7,352,085 B2 | * | 4/2008 | Ray et al. ..................... | 307/125 |

FOREIGN PATENT DOCUMENTS

| | | |
|---|---|---|
| JP | 06-051873 | 2/1994 |
| JP | 06-282361 | 10/1994 |
| JP | 2004-262065 | 9/2004 |

* cited by examiner

*Primary Examiner* — Rexford N Barnie
*Assistant Examiner* — Toan Vu
(74) *Attorney, Agent, or Firm* — DLA Piper LLP (US)

(57) ABSTRACT

An electronic device controlled by software, includes a first switch that shuts off electric power supplied via a first supply line in accordance with operation by a user; a second switch that shuts off electric power supplied via a second supply line in accordance with control by the software; and a delay circuit that outputs an instruction signal for shutting off electric power supplied via the second supply line to the second switch after a first delay time which is longer than a time required for a termination process of the electronic device has passed when the first switch shut off electric power supplied via the first supply line, wherein the delay circuit stores, as a setting value, a second delay time which is shorter than the time required for the termination process of the electronic device at a time of startup of the electronic device.

6 Claims, 6 Drawing Sheets

<WHEN STATUS IS STORED>

ELECTRONIC DEVICE AND PRINTING DEVICE

BACKGROUND

1. Technical Field

The invention relates to an electronic device and a printing device.

2. Related Art

In an electronic device such as a printing device, when a user gives an instruction to turn off power, a process for data protection or the like (hereinafter, referred to as "termination process") is performed by software or the like incorporated in the electronic device (for example, see JP-A-2004-262065). Time required for the termination process depends on a system state. Therefore, the termination process may be completed in a short period of time in some cases, while in other cases completed for a long period of time (for example, 30 seconds or longer).

There has been an electronic device in which power is turned off after a predetermined period of time (hereinafter, referred to as "delay time") has passed from an instruction to turn off the power using a delay circuit (for example, timer circuit) of hardware or the like, in order to secure the time required for the termination process. The delay time is predetermined so that the power of the device is not turned off during the termination process even when it takes a long period of time to complete the termination process.

Meanwhile, when software hangs up, the termination process cannot be executed and therefore the power of the system cannot be turned off. Accordingly, the power of the system is turned off using the above delay circuit of the hardware or the like when the software hangs up.

However, when the power is turned off by using the above delay circuit, the following problem arises. That is, the user have to wait for a long delay time secured for the termination process from the instruction to turn off the power until the power of the system is turned off, even when the termination process cannot be executed because the software hangs up. Further, the conditions of a system cannot be displayed on a panel or the like in a state where the software hangs up. This results in that the user has to wait for a long period of time while the user does not know the conditions of the system.

SUMMARY

An advantage of some aspects of the invention is to provide a technique of turning off power of a system without a delay time for a termination process when software hangs up.

An electronic device according to an aspect of the invention is controlled by software. The electronic device includes a first switch that shuts off electric power supplied via a first supply line in accordance with operation by a user, a second switch that shuts off electric power supplied via a second supply line in accordance with control by the software, and a delay circuit that outputs an instruction signal for shutting off electric power supplied via the second supply line to the second switch after a first delay time which is longer than a time required for a termination process of the electronic device has passed when the first switch shut off electric power supplied via the first supply line. In the electronic device, the delay circuit stores, as a setting value, a second delay time which is shorter than the time required for the termination process of the electronic device at a startup of the electronic device. In a case where the software hangs up, the delay circuit outputs the instruction signal to the second switch after the second delay time stored as the setting value has passed when the first switch shut off electric power supplied via the first supply line.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a case where the invention is applied to a printing device 50 as an electronic device according to an embodiment of the invention is described as an example.

Figure 1:
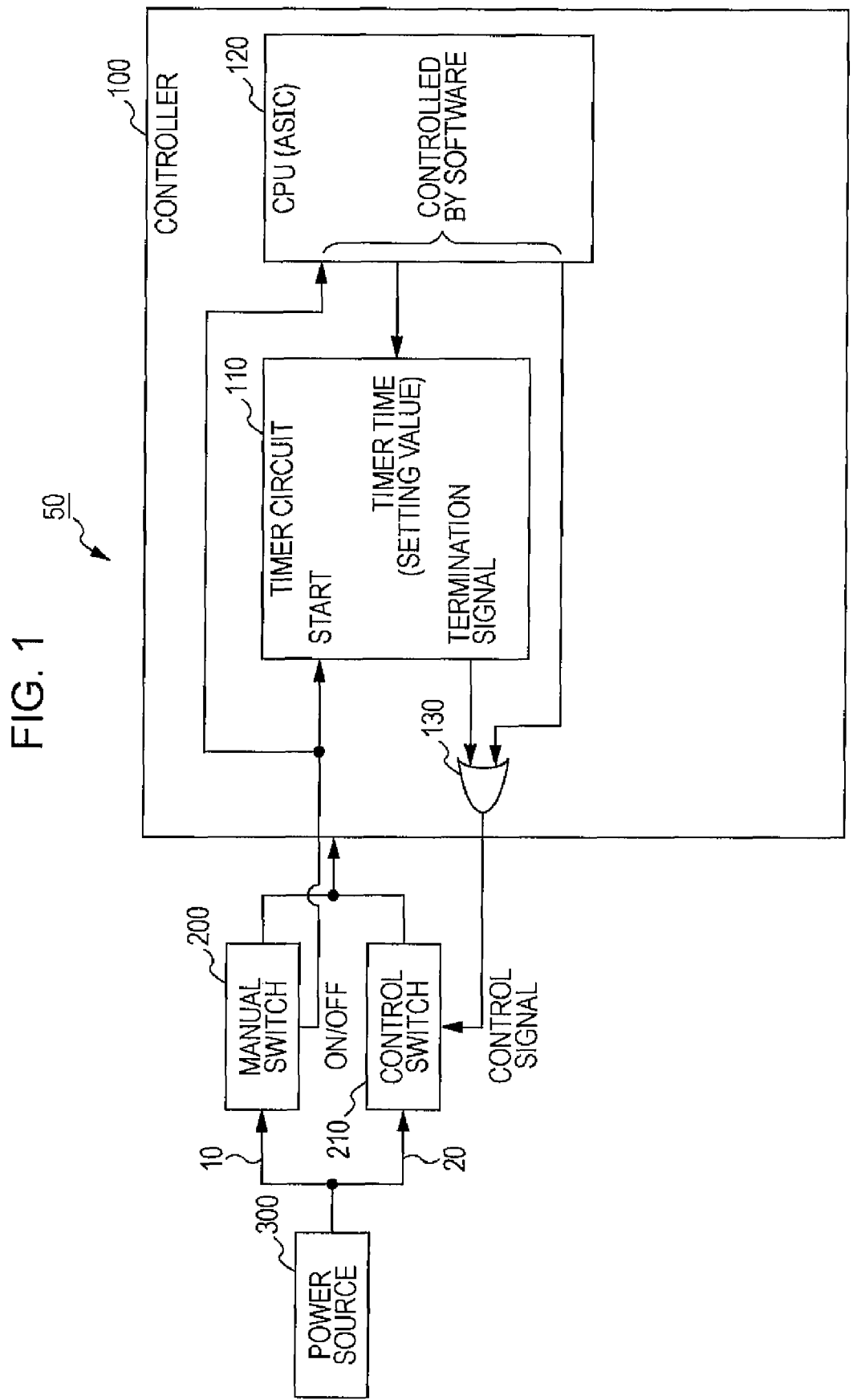
FIG. 1 is a diagram illustrating a schematic configuration of a printing device according to a first embodiment of the invention.

FIG. 1 is a diagram illustrating a schematic configuration of the printing device 50 according to a first embodiment of the invention.

The printing device 50 including a print engine (not shown) and the like has a general printing function.

As shown in FIG. 1, the printing device 50 includes a controller 100 controlling the printing device 50, a power source 300 supplying electric power to the controller 100, a manual switch 200 and a control switch 210 switching "ON" and "OFF" of electric power supplied from the power source 300 to the controller 100.

The power source 300 supplies electric power to the controller 100 via a plurality of electric power supply lines (a first supply line 10, a second supply line 20) provided in parallel. The power source 300 may be a general AC adapter including a transformer, a rectifying circuit, a smoothing circuit, and the like, for example. The power source 300 supplies electric power to the controller 100 by converting AC power supplied from outside to DC power.

The manual switch 200 is a mechanical switch for receiving an instruction to start up the printing device 50 and an instruction to stop the printing device 50 from a user. Examples of the manual switch 200 include a rocker switch, a toggle switch, a lever switch, or the like. The manual switch 200 switches a terminal of the first supply line 10 on the side of the power source 300 and a terminal on the side of the controller 100 to an "ON" (conduction) state or an "OFF" (non-conduction) state by mechanical operation. Here, the mechanical operation means operation in, which a lever or the like is set at a predetermined position of "ON" or "OFF".

When the manual switch 200 is turned "ON", electric power is supplied from the power source 300 to the controller 100 via the first supply line 10. On the other hand, when the manual switch 200 is turned "OFF", electric power supplied from the power source 300 to the controller 100 via the first supply line 10 is shut off.

Further, the manual switch 200 outputs a signal (ON/OFF signal) indicating whether or not the manual switch 200 is in the "ON" state or the "OFF" state to the controller 100 (a timer circuit 110 and a CPU 120 which will be described later).

The control switch 210 is an electrical switch controlled by the controller 100. That is to say, the control switch 210 is different from the manual switch 200 because a user cannot directly operate the control switch 210. The control switch 210 switches a terminal of the second supply line 20 on the side of the power source 300 and a terminal on the side of the controller 100 to an "ON" (conduction) state or an "OFF" (non-conduction) state in accordance with a control signal output from the controller 100.

When the control switch 210 is turned "ON", electric power is supplied from the power source 300 to the controller 100 via the second supply line 20. Meanwhile, when the control switch 210 is turned "OFF", electric power supplied from the power source 300 to the controller 100 via the second supply line 20 is shut off.

The controller 100 includes the timer circuit 110, the CPU 120 and an OR circuit 130. The controller 100 can control a part (for example, a print engine) or all of units in the printing device 50 when electric power is supplied via at least one electric power supply line of the two, the first supply line 10 and the second supply line 20.

The CPU 120 is a main electronic circuit of the controller 100 and controls each part (each component of the printing device 50) by software. Specifically, the CPU 120 reads out a program stored in a memory (not shown) such as a ROM to control the printing device in various manners in accordance with the read program.

For example, the CPU 120 performs the termination process as described above when receiving an instruction to stop the system (to shut down the printing device 50) through the manual switch 200 from a user. Then, upon completion of the termination process, the CPU 120 outputs a control signal for turning "OFF" the control switch 210.

Further, the CPU 120 sets a duration which is a time from the start of counting to the end thereof (hereinafter called "duration" of the timer circuit 110). For example, the CPU 120 can set the duration of the timer circuit 110 to a sufficiently short period of time TC (a period of time shorter than a standard period of time required for the termination process of the printing device 50: 1 second, for example). Alternatively, the CPU 120 can also set the duration of the timer circuit 110 to a long period of time TMAX (a period of time longer than the standard period of time required for the termination process of the printing device 50: 30 seconds, for example). The long period of time TMAX is an upper limit which can be set.

The CPU 120 is controlled by software. Accordingly, the CPU 120 can neither output a control signal for turning "OFF" the control switch 210 nor set the duration of the timer circuit 10 in a state where software hangs up.

The timer circuit 110 outputs a control signal for turning "OFF" the control switch 210 by controlling hardware. Therefore, in place of the CPU 120, the timer circuit 110 can output the control signal (termination signal) for turning "OFF" the control switch 210 even in a state where software hangs up.

For example, the timer circuit 110 starts counting at a timing when the manual switch 200 is turned "OFF" (at a timing when OFF signal is input from the manual switch 200), and outputs the control signal (termination signal) for turning "OFF" the control switch 210 after the set duration from the start of counting has passed. Therefore, the duration set in the timer circuit 110 corresponds to a delay time from an instruction to turn off the power (turn "OFF" the manual switch 200) by the user to the power of the system being actually turned off (both the manual switch 200 and the control switch 210 are turned "OFF"). Accordingly, when the above short period of time TC is set as a duration, the delay time until the power of the system is turned off corresponds to the time TC. When the above long period of time TMAX is set as a duration, the delay time until the power of the system is turned off corresponds to the time TMAX.

When a control signal (termination signal) for turning "OFF" the control switch 210 is input from at least one of the timer circuit 110 and the CPU 120, the OR circuit 130 outputs the input control signal to the control switch 210. Accordingly, the control switch 210 is switched to the "OFF" state. The OR circuit 130 outputs a control signal for turning "ON" the control switch 210 only when the control signal for turning "OFF" the control switch 210 is input from neither the timer circuit 110 nor the CPU 120.

The printing device 50 to which the first embodiment of the invention is applied is configured as described above. However, the configuration of the printing device 50 is not limited thereto. For example, the printing device 50 may include another configuration for functioning as a printer, a multifunction device, a facsimile machine, or a copying machine.

The controller 100 may include as main components thereof a RAM for temporarily storing data and the like as a main memory, an interface for controlling input to/output from a host and the like, and system buses serving as communication paths among components, in addition to the above CPU 120, the ROM (memory) and the like. Further, the CPU 120 may include an ASIC (Application Specific Integrated Circuit) designed exclusively for each processing.

Each component as described above is classified according to main processing contents in order to make the configuration of the printing device 50 be understood easily. The invention is not limited by ways of classifications or names of the components. The configuration of the printing device 50 can be classified into much more components according to processing contents. Further, the configuration of the printing device 50 may be classified such that one component executes much more processings. Such processing(s) by each component may be executed using a piece of hardware or a plurality of pieces of hardware.

Figure 2:
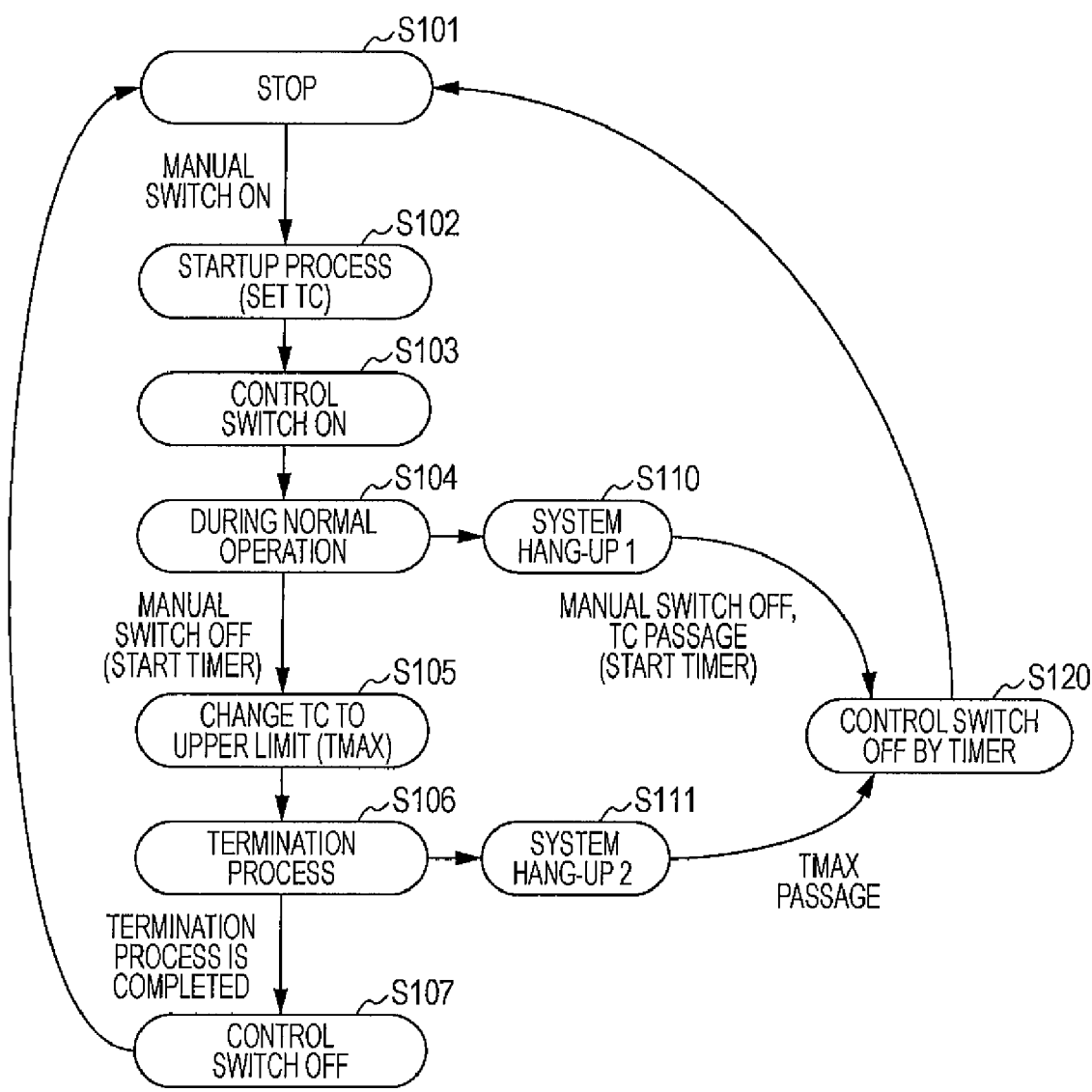
FIG. 2 is a state transition diagram illustrating a power control process performed by the printing device according to the first embodiment of the invention.

Next, characteristic operation of the printing device 50 having the above configuration is described. FIG. 2 is a state transition diagram for illustrating a power control process performed by the printing device 50.

In a state where the printing device 50 is not operated, both of the manual switch 200 and the control switch 210 are in the "OFF" state (S101). Accordingly, electric power supplied from the power source 300 to the controller 100 is shut off.

In the state where the printing device 50 is not operated, when a user gives an instruction to start up the printing device 50, the controller 100 performs a startup process (S102). Specifically, when the user sets the lever to the "ON" position, the manual switch 200 switches the first supply line 10 to the "ON" (conduction) state. Accordingly, electric power is supplied from the power source 300 to the controller 100. At the same time, the manual switch 200 supplies a signal indicating that the switch is in the "ON" state (ON signal) to each of the timer circuit 110 and the CPU 120. Here, when the CPU 120 receives the ON signal supplied from the manual switch 200, the CPU 120 reads out a program for a startup process from a memory to execute the startup process. In the startup process, the CPU 120 registers the short period of time TC as described above as a setting value of the duration (delay time) of the timer circuit 110 (the timer circuit 110 receives an request from the CPU 120 to store the setting value).

The CPU 120 turns "ON" the control switch 210 (S103). Specifically, the CPU 120 outputs a control signal for tuning "ON" the control switch 210. Here, when the control switch 210 receives the control signal output from the CPU 120, the control switch 210 switches the second supply line 20 to "ON" (conduction) state.

Then, the CPU 120 allows the printing device 50 to be in a normal operation state (S104). Note that the normal operation state refers to a state where the software does not hang up. For example, the CPU 120 controls printing and the like in the normal operation state.

In the normal operation state, when the user gives an instruction to stop the system, the controller 100 changes the duration of the timer circuit 110 to TMAX (S105). Specifically, when the user sets the lever to the "OFF" position, the manual switch 200 switches the first supply line 10 to the "OFF" (non-conduction) state. Therefore, electric power supplied via the first supply line 10 is shut off. At the same time, the manual switch 200 supplies a signal indicating that the switch is in the "OFF" state (OFF signal) to each of the timer circuit 110 and the CPU 120. Here, when the CPU 120 receives the OFF signal supplied from the manual switch 200, the CPU 120 registers the TMAX as a setting value of the duration (delay time) of the timer circuit 110 (the timer circuit 110 receives a request from the CPU 120 to change the setting value to TMAX and store the result). Meanwhile, when the timer circuit 110 receives the OFF signal supplied from the manual switch 200, the timer circuit 110 starts counting.

Subsequently, the CPU 120 performs the termination process (S106). Specifically, the CPU 120 reads out a program for the termination process from the memory to execute the termination process.

When the termination process is completed, the CPU 120 turns "OFF" the control switch 210 (S107). Specifically, the CPU 120 outputs a control signal for tuning "OFF" the control switch 210. When the control switch 210 receives the control signal output from the CPU 120, the control switch 210 switches the second supply line 20 to the "OFF" (non-conduction) state. Therefore, electric power supplied via the second supply line 20 is shut off and the printing device 50 stops operation (S101).

The software may hang up due to a malfunction of the CPU 120 (software) in a normal operation of S104 (S110: hang-up 1). In a case where the software hangs up, when a user gives an instruction to stop the printing device 50, the controller 100 controls the timer circuit 110 to start counting. Specifically, the timer circuit 110 receives an OFF signal supplied from the manual switch 200 to start counting.

At this time, the short period of time TC is set as the duration (delay time) of the timer circuit 110. The timer circuit 110 outputs a control signal (termination signal) for turning "OFF" the control switch 210 after the short period of time TC has passed. The control switch 210 switches to the "OFF" state to shut off electric power supplied via the second supply line 20 (S120). Accordingly, when the user gives an instruction to stop the printing device 50, the timer circuit 110 can stop the system immediately (in a delay time of the short period of time TC).

Further, the software may hang up due to a malfunction of the CPU 120 (software) during the termination process of S106 (S111: hang-up 2). In this case, since the manual switch 200 has been already turned "OFF" in S104, the timer circuit 110 has to wait from the time the manual switch 200 being turned "OFF" to the time the TMAX (already set in S105) being passed. Then, the timer circuit 110 outputs a control signal (termination signal) for turning "OFF" the control switch 210. Here, the control switch 210 is switched to the "OFF" state to shut off electric power supplied via the second supply line (S120). Accordingly, the printing device 50 stops.

The above power control processes are performed by the printing device 50. This makes it possible to immediately stop the printing device 50 without waiting for a long period of time TMAX when the software hangs up in the normal operation. Further, when an instruction to stop the printing device 50 is given in the normal operation, a setting value of the duration of the timer circuit 110 is changed to the TMAX (S105). Therefore, the printing device 50 does not stop during the termination process (S106).

Second Embodiment

Figure 3:
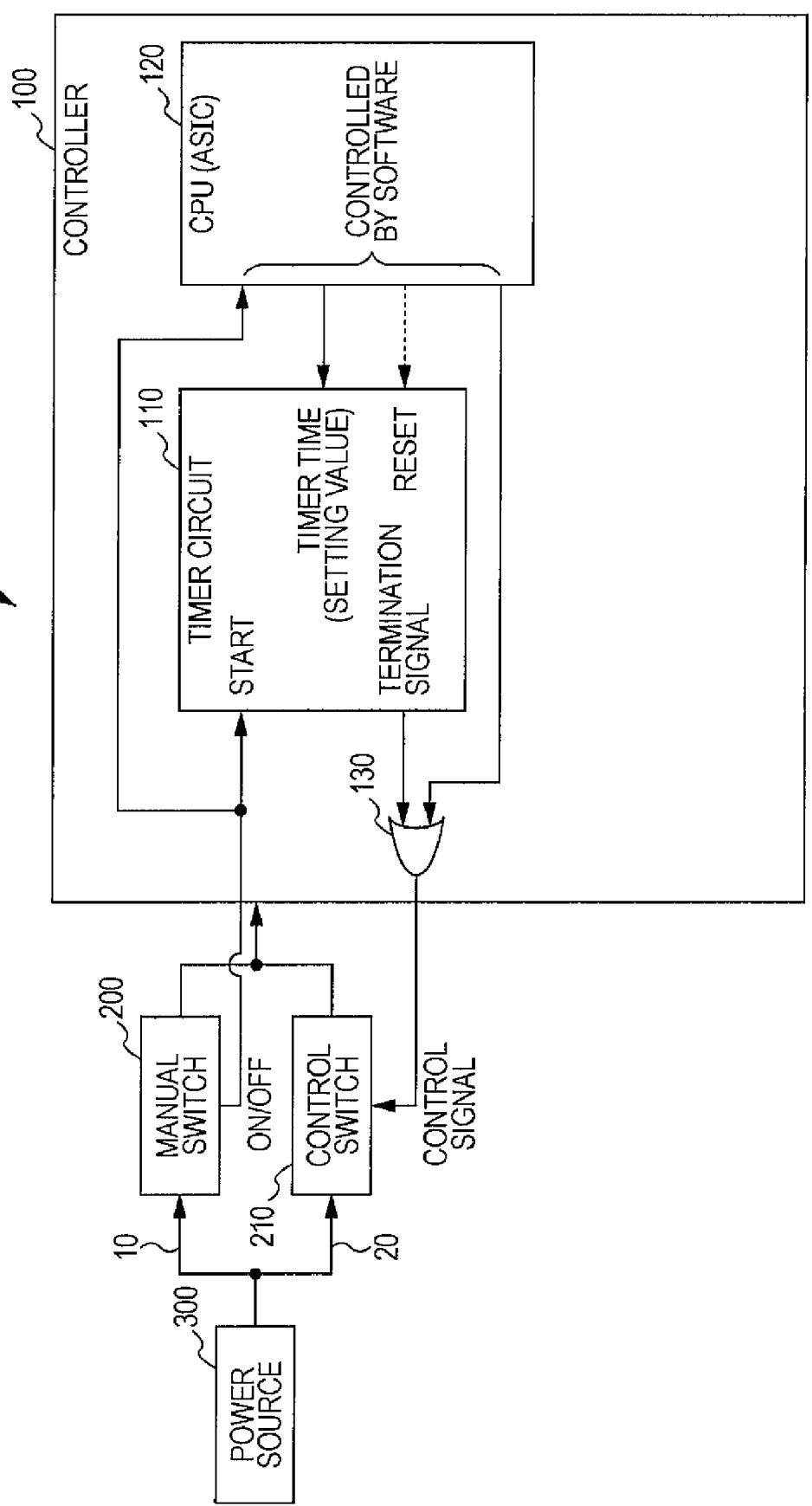
FIG. 3 is a diagram illustrating a schematic configuration of a printing device according to a second embodiment of the invention.

FIG. 3 is a diagram illustrating a schematic configuration of a printing device 50 according to a second embodiment of the invention.

The second embodiment is different from the above first embodiment because count of the timer circuit 110 can be reset (shown with a dashed arrow) in the second embodiment. Same configurations as those in the first embodiment are not described in detail.

The CPU 120 has a function of resetting the count of the timer circuit 110 in addition to the functions described in the first embodiment. For example, the CPU 120 resets the count before the count reaches the set duration of the timer circuit 110. This makes it possible to allow the timer circuit 110 so as not to output the control signal (termination signal) for turning "OFF" the control switch 210. The CPU 120 repeatedly resets the count as such during the above "termination process (S106)". This prevents the printing device 50 from stopping during the termination process.

The timer circuit 110 includes a configuration for resetting the count in accordance with an instruction from the CPU 120, in addition to the configurations described in the first embodiment. For example, when an instruction signal to reset the count is supplied from the CPU 120, the timer circuit 110 returns the count to "0" to restart counting.

Figure 4:
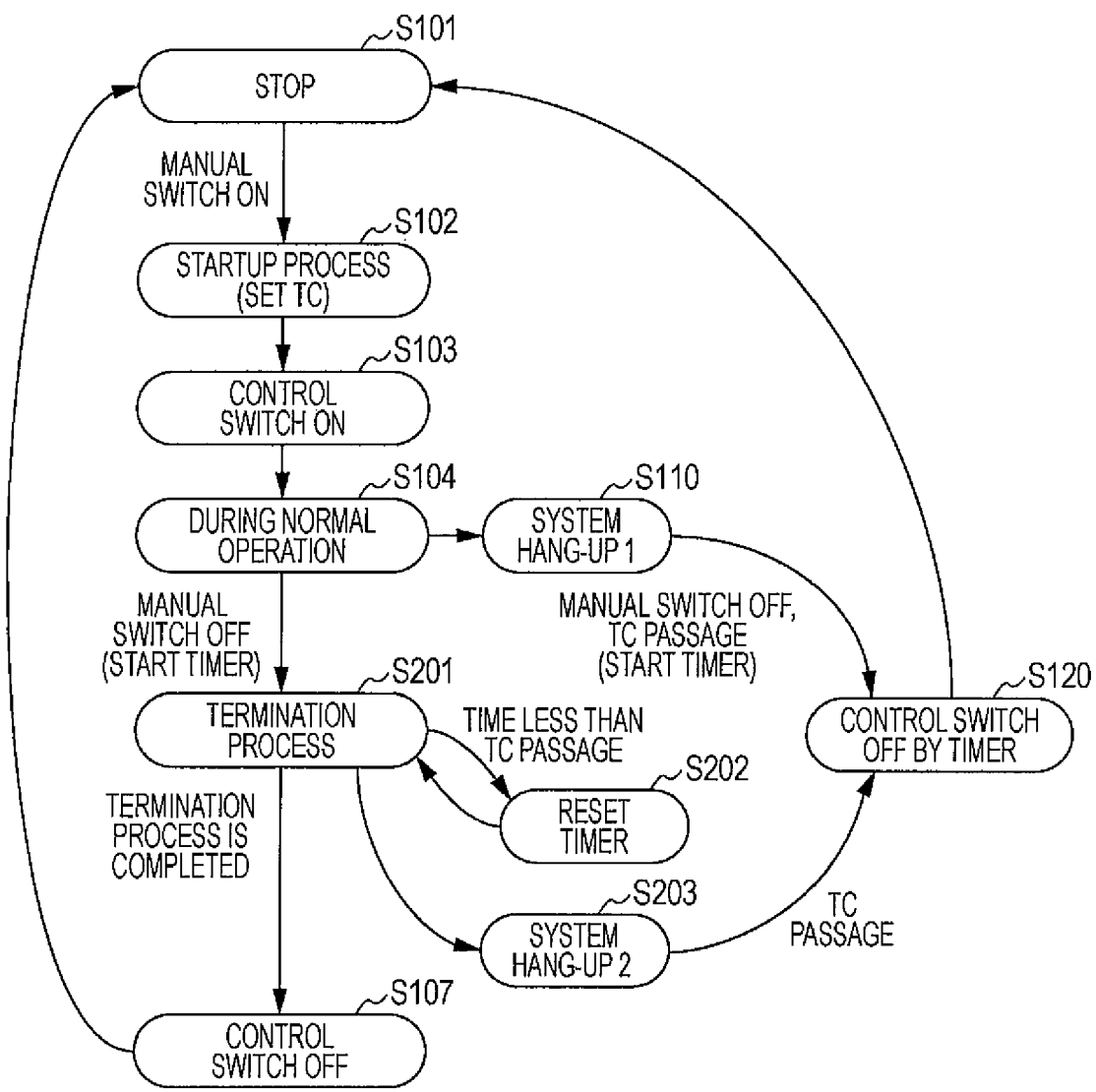
FIG. 4 is a state transition diagram for illustrating a power control process performed by the printing device according to the second embodiment of the invention.

FIG. 4 is a state transition diagram for illustrating a power control process performed by the printing device 50 according to the second embodiment of the invention.

From S101 to S104, the controller 100 performs the same control as that in the first embodiment. Control performed when software hangs up in the normal operation (S110, S120) is the same as that in the first embodiment.

Control after the user gives an instruction to stop the printing device 50 during the normal operation (S104) in the second embodiment is different from that in the first embodiment. Specifically, when the user gives an instruction to stop the printing device 50 in a state where the software normally operates, the controller 100 does not change the duration of the timer circuit 110 (keeping the time TC) to start the termination process (S201).

Note that, following an instruction to stop the printing device 50 by the user, the manual switch 200 supplies a signal indicating that the switch is in the "OFF" state (OFF signal) to the timer circuit 110. Accordingly, the timer circuit 110 starts counting.

The CPU 120 resets the count before the count of the timer circuit 110 reaches the time TC (less than TC) during the termination process of S201 (S202). The CPU 120 repeatedly resets the count each time the count of the timer circuit 110 almost reaches the time TC. Therefore, the timer circuit 110 never outputs the control signal (termination signal) for turning "OFF" the control switch 210 while the termination process is executed in the CPU 120.

When the termination process is completed, the CPU 120 turns "OFF" the control switch 210 (S107) as in the first embodiment.

When the software hangs up during the termination process in S201 (S203: hang-up 2), the CPU (software) 120 cannot reset the count in S202. Therefore, the timer circuit 110 outputs a control signal (termination signal) for turning "OFF" the control switch 210 after waiting only a short period of time TC from the time when the timer circuit 110 has reset the count last time. Then the control switch 210 is switched to the "OFF" state to shut off electric power supplied via the second supply line (S120).

Accordingly, the printing device 50 according to the second embodiment can stop without waiting for a long period time TMAX even when software hangs up during the termination process.

Third Embodiment

Figure 5:
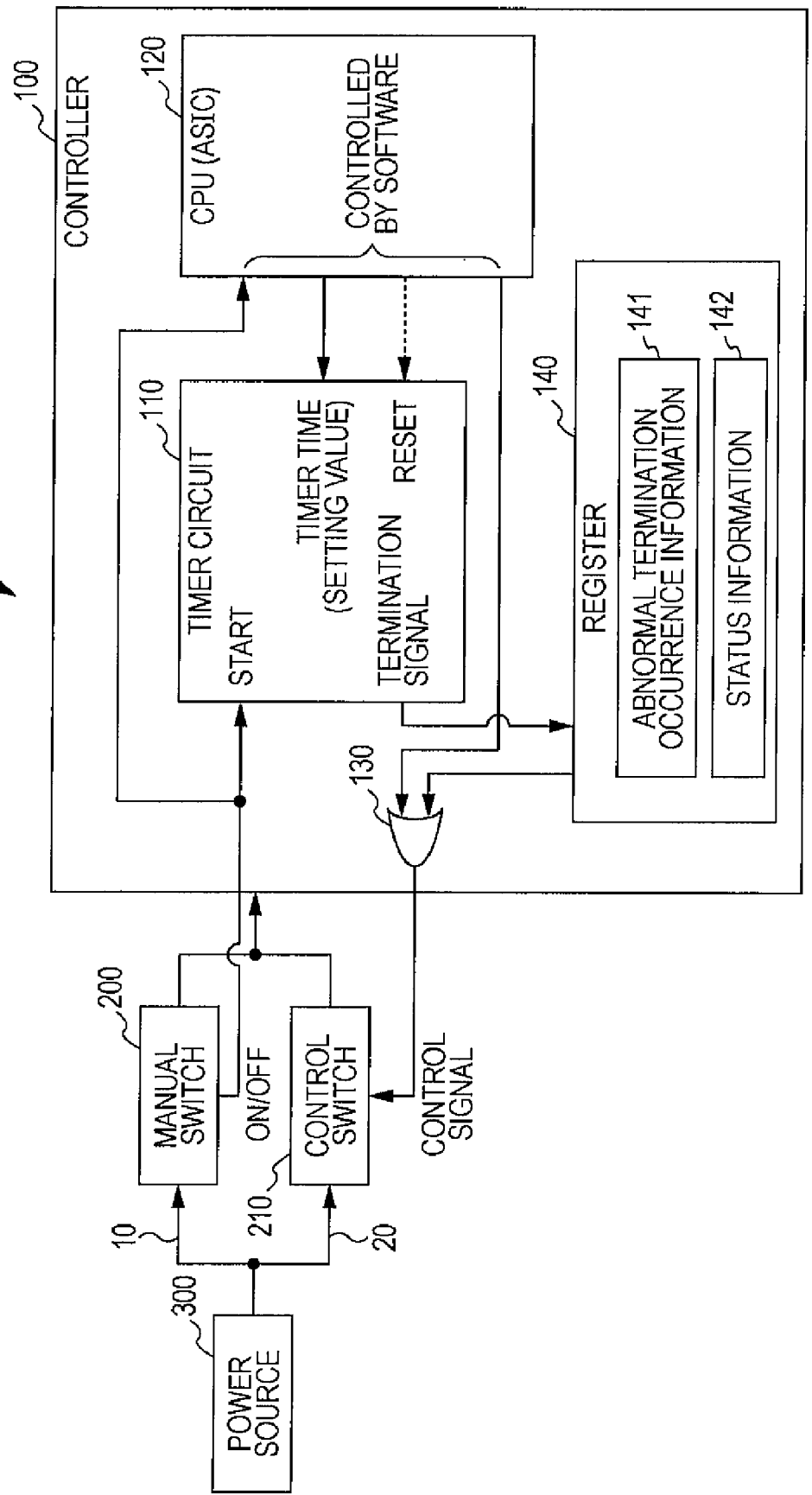
FIG. 5 is a diagram illustrating a schematic configuration of a printing device according to a third embodiment of the invention.

FIG. 5 is a diagram illustrating a schematic configuration of a printing device 50 according to a third embodiment of the invention.

The third embodiment is different from the above second embodiment because a history can be recorded in the third embodiment. To be more specific, the history can be recorded that the printing device 50 has stopped before the termination process being completed (hereinafter, referred to as "abnormal termination") due to the software hang-up or the like. Same configurations as those in the second embodiment are not described in detail.

The controller 100 includes a register 140 for recording that the printing device 50 has abnormally terminated, in addition to the components described in the second embodiment. Note that the register 140 holds recording content even in a state where electric power is not supplied from the power source 300 to the controller 100.

The register 140 has a storage region for storing abnormal termination occurrence information 141 indicating that the printing device 50 has abnormally terminated and status information 142 indicating a status of the printing device 50. For example, the abnormal termination occurrence information 141 may be a flag indicating whether or not the printing device 50 has abnormally terminated. The status information 142 is a value which is previously determined in accordance with the status of the printing device 50, for example.

The timer circuit 110 outputs a control signal (termination signal) for turning "OFF" the control switch. 210 to the register 140.

The register 140 changes (stores) the abnormal termination occurrence information 141 and the status information 142 in accordance with a control signal when the register 140 receives the control signal output from the timer circuit 110. Then, after the change (storing) of the abnormal termination occurrence information 141 and the status information 142 is completed, the register 140 outputs the control signal (termination signal) for turning "OFF" the control switch 210 to the OR circuit 130.

Figure 6:
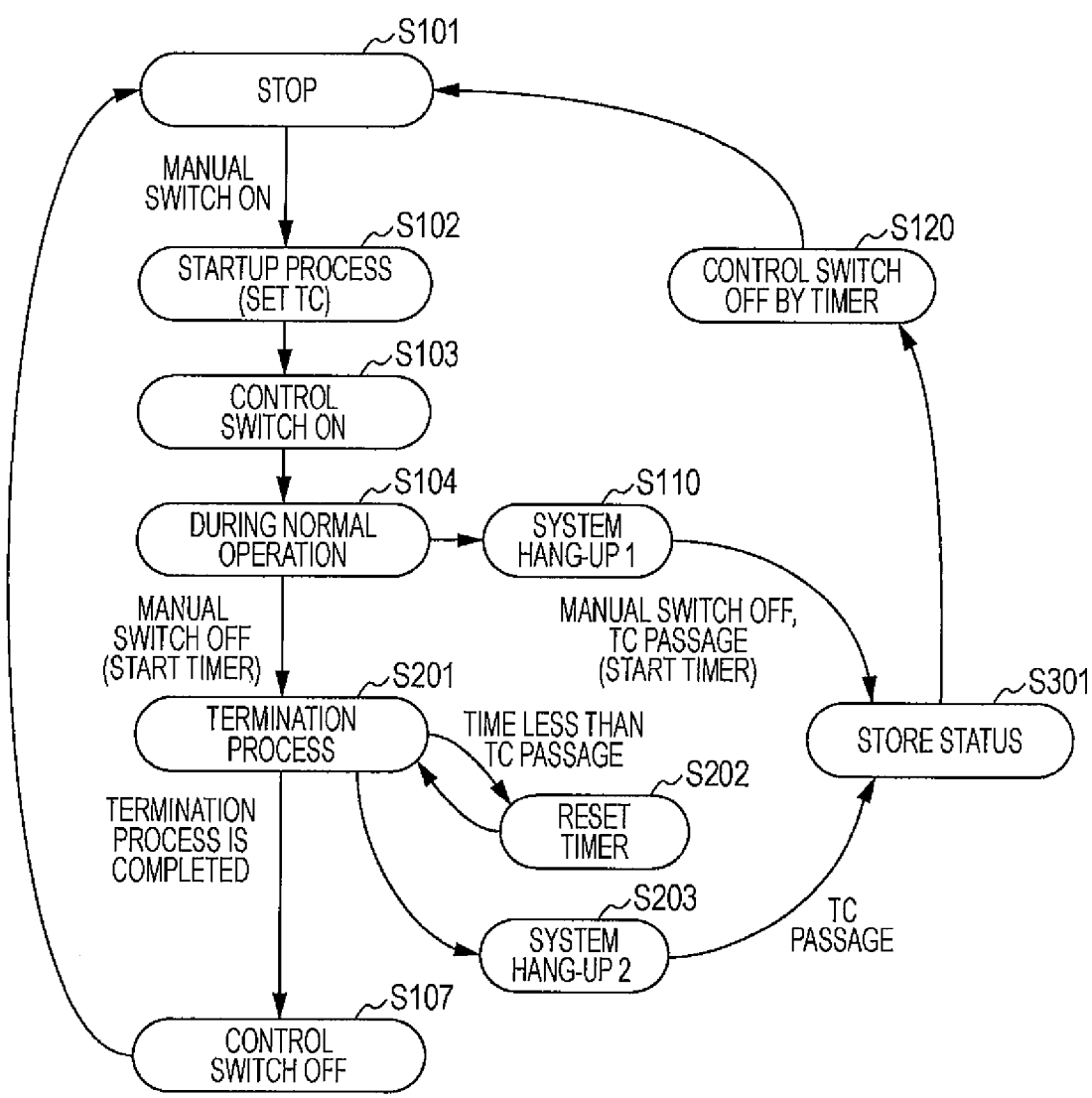
FIG. 6 is a state transition diagram for illustrating a power control process performed by the printing device according to the third embodiment of the invention.

FIG. 6 is a state transition diagram illustrating a power control process performed by the printing device 50 according to the third embodiment of the invention.

The controller 100 performs the same control as that in the second embodiment other than the control at 5301 shown in FIG. 6.

In the third embodiment, when the timer circuit 110 outputs a control signal (termination signal) for turning "OFF" the control switch 210 (S114, S203), the control signal is supplied to the register 140.

Here, the register 140 stores the abnormal termination occurrence information 141 (S301). Specifically, the register 140 turns "ON" the flag indicating whether or not the printing device 50 has abnormally terminated.

The register 140 detects a status of the printing device 50 and stores the detected status (the status information 142) (S301). Specifically, the register 140 stores pieces of information such as information whether the printing device 50 is abnormally terminated because the software hangs up during the normal operation (hang-up 1) or because the software hangs up during the termination operation (hang-up 2).

The register 140 outputs the control signal (termination signal) for turning "OFF" the control switch 210 to the OR circuit 130 (to the control switch 210 via the OR circuit 130), after storing the abnormal termination occurrence information 141 and the status information 142. Here, the control switch 210 is switched to the "OFF" state in accordance with the control signal (termination signal) output from the timer circuit 110 to shut off electric power supplied to the controller 100 via the second supply line 20 (S120).

Accordingly, the printing device 50 according to the third embodiment stores information about the abnormal termination of the printing device 50 or the status of the printing device 50 at the time of the abnormal termination. This makes it possible to read out the pieces of information (141, 142) when the printing device 50 is started up after the abnormal termination and to perform a startup process in accordance with the status of the printing device 50.

It is to be noted that the invention is not limited to each embodiment as described above and various modifications and applications can be made.

For example, in the above embodiments, the timer circuit 110 is used for turning off the power after a certain period of time (delay time) has passed from the time the instruction is output to turn off the power. However, other pieces of hardware having the same function as that of the timer circuit 110 may be used in place of the timer circuit 110 in the invention. Further, software (CPU other than the CPU 120, or the like) having the same function as that of the timer circuit 110 may be used as long as the software can be operated independently from the CPU 120.

Further, a case where the invention is applied to the printing device 50 is exemplified in the above embodiments. However, the invention is not limited thereto. For example, the invention may be applied to electronic devices including a power source, software and hardware, such as a television set, a digital camera, a portable phone, and a portable game machine, etc.

The entire disclosure of Japanese Patent Application No. 2009-038958, filed Feb. 23, 2009 is expressly incorporated by reference herein.

What is claimed is:

1. An electronic device controlled by software, comprising:
   a first switch that shuts off electric power supplied via a first supply line in accordance with operation by a user;
   a second switch that shuts off electric power supplied via a second supply line in accordance with control by the software; and
   a delay circuit that outputs an instruction signal for shutting off electric power supplied via the second supply line to the second switch after a first delay time which is longer than a time required for a termination process of the electronic device has passed when the first switch shut off electric power supplied via the first supply line,
   wherein the delay circuit stores, as a setting value, a second delay time which is shorter than the time required for the termination process of the electronic device at a time of startup of the electronic device, and
   in a state where the software hangs up, the delay circuit outputs the instruction signal to the second switch after the second delay time stored as the setting value has passed when the first switch shut off electric power supplied via the first supply line.

2. An electronic device controlled by software, comprising:
   a first switch that shuts off electric power supplied via a first supply line in accordance with operation by a user;
   a second switch that shuts off electric power supplied via a second supply line in accordance with control by the software; and
   a delay circuit that outputs an instruction signal for shutting off electric power supplied via the second supply line to the second switch after a first delay time which is longer than a time required for a termination process of the electronic device has passed when the first switch shut off electric power supplied via the first supply line,
   wherein the delay circuit stores, as a setting value, a second delay time which is shorter than the time required for the termination process of the electronic device at a time of startup of the electronic device, and wherein,
   in a state where the software does not hang up, the delay circuit does not output the instruction signal when the first switch shut off electric power supplied via the first supply line, and
   in a state where the software hangs up, the delay circuit outputs the instruction signal to the second switch after the second delay time stored as the setting value has passed when the first switch shut off electric power supplied via the first supply line.

3. The electronic device according to claim 2,
   wherein the delay circuit includes a timer circuit, and
   in a state where the software does not hang up, the delay circuit does not output the instruction signal due to count in the timer circuit being reset, when the first switch shut off electric power supplied via the first supply line.

4. The electronic device according to claim 2,
   wherein in the case where the software hangs up during the termination process, the delay circuit outputs the instruction signal to the second switch after the second delay time stored as the setting value has passed when the first switch shut off electric power supplied via the first supply line.

5. An electronic device controlled by software, comprising:
   a first switch that shuts off electric power supplied via a first supply line in accordance with operation by a user;
   a second switch that shuts off electric power supplied via a second supply line in accordance with control by the software;
   a delay circuit that outputs an instruction signal for shutting off electric power supplied via the second supply line to the second switch after a first delay time which is longer than a time required for a termination process of the electronic device has passed when the first switch shut off electric power supplied via the first supply line; and
   a storing unit that stores information indicating that the electronic device is abnormally terminated in accordance with the output of the instruction signal by the delay circuit,
   wherein the delay circuit stores, as a setting value, a second delay time which is shorter than the time required for the termination process of the electronic device at a time of startup of the electronic device,
   in a state where the software does not hang up, the delay circuit does not output the instruction signal when the first switch shut off electric power supplied via the first supply line, and
   in a state where the software hangs up, the delay circuit outputs the instruction signal to the second switch after the second delay time stored as the setting value has passed when the first switch shut off electric power supplied via the first supply line.

6. The electronic device according to claim 5,
   wherein in the case where the software hangs up during the termination process, the delay circuit outputs the instruction signal to the second switch after the second delay time stored as the setting value has passed when the first switch shut off electric power supplied via the first supply line.

* * * * *